US011908591B2

(12) United States Patent
De Jager et al.

(10) Patent No.: US 11,908,591 B2
(45) Date of Patent: Feb. 20, 2024

(54) ENRICHMENT AND RADIOISOTOPE PRODUCTION

(71) Applicant: ASML Netherlands B.V., Veldhoven (NL)

(72) Inventors: Pieter Willem Herman De Jager, Middelbeers (NL); Antonius Theodorus Anna Maria Derksen, Elst (NL)

(73) Assignee: ASML Netherlands B.V., Veldhoven (NL)

( * ) Notice: Subject to any disclaimer, the term of this patent is extended or adjusted under 35 U.S.C. 154(b) by 170 days.

(21) Appl. No.: 17/283,823

(22) PCT Filed: Sep. 13, 2019

(86) PCT No.: PCT/EP2019/074443
§ 371 (c)(1),
(2) Date: Apr. 8, 2021

(87) PCT Pub. No.: WO2020/074209
PCT Pub. Date: Apr. 16, 2020

(65) Prior Publication Data
US 2021/0343443 A1    Nov. 4, 2021

(30) Foreign Application Priority Data
Oct. 12, 2018   (EP) ..................... 18200179

(51) Int. Cl.
*G21G 1/12* (2006.01)
*B01D 59/48* (2006.01)
(52) U.S. Cl.
CPC ............... *G21G 1/12* (2013.01); *B01D 59/48* (2013.01)
(58) Field of Classification Search
CPC .................. G21G 1/12; B01D 59/48
See application file for complete search history.

(56) References Cited

U.S. PATENT DOCUMENTS

| 3,204,101 A * | 8/1965 | Brumfield | G01J 3/2803 250/226 |
| 6,487,003 B1 * | 11/2002 | Suzuki | H05G 2/00 372/99 |
| 6,614,505 B2 * | 9/2003 | Koster | G03F 7/70916 355/30 |

(Continued)

FOREIGN PATENT DOCUMENTS

| GB | 1 355 950 A | 6/1974 |
| JP | S53100398 A | 9/1978 |

(Continued)

OTHER PUBLICATIONS

International Search Report and Written Opinion of the International Searching Authority directed to related International Patent Application No. PCT/EP2019/074443, dated Nov. 25, 2019; 8 pages.

(Continued)

*Primary Examiner* — Lily C Garner
(74) *Attorney, Agent, or Firm* — Sterne, Kessler, Goldstein & Fox P.L.L.C.

(57) ABSTRACT

A combined enrichment and radioisotope production apparatus comprising an electron source arranged to provide an electron beam, the electron source comprising an electron injector and an accelerator, an undulator configured to generate a radiation beam using the electron beam, a molecular stream generator configured to provide a stream of molecules which is intersected by the radiation beam, a receptacle configured to receive molecules or ions selectively received from the stream of molecules, and a target support structure configured to hold a target upon which the electron beam is incident in use.

20 Claims, 3 Drawing Sheets

(56) References Cited

U.S. PATENT DOCUMENTS

| | | | | |
|---|---|---|---|---|
| 7,935,218 | B2* | 5/2011 | Moors | G03F 7/70041 |
| | | | | 216/60 |
| 9,170,217 | B2* | 10/2015 | Chapman | G01N 23/20008 |
| 9,853,412 | B2* | 12/2017 | Nikipelov | H01S 3/1103 |
| 9,892,808 | B2 | 2/2018 | Diamond et al. | |
| 10,437,154 | B2* | 10/2019 | Nikipelov | G01J 1/429 |
| 10,884,339 | B2* | 1/2021 | Engelen | G03F 7/70033 |
| 11,170,907 | B2* | 11/2021 | De Jager | G21G 1/10 |
| 2010/0215137 | A1 | 8/2010 | Nagai et al. | |
| 2011/0096887 | A1* | 4/2011 | Piefer | G21G 1/08 |
| | | | | 376/193 |
| 2015/0185184 | A1 | 7/2015 | Guia et al. | |
| 2016/0147161 | A1* | 5/2016 | Nikipelov | H01S 3/0903 |
| | | | | 355/67 |
| 2016/0225477 | A1* | 8/2016 | Banine | G21K 1/067 |
| 2019/0066859 | A1* | 2/2019 | De Jager | G21G 1/12 |

FOREIGN PATENT DOCUMENTS

| | | | |
|---|---|---|---|
| JP | S58112031 A | 7/1983 | |
| JP | H0487628 A | 3/1992 | |
| JP | H0647257 A * | 2/1994 | |
| TW | 201818983 A | 6/2018 | |
| WO | WO-2015067467 A1 * | 5/2015 | G03F 7/70208 |
| WO | WO 2016/139008 A1 | 9/2016 | |
| WO | WO 2017/076961 A1 | 5/2017 | |

OTHER PUBLICATIONS

Taiwanese Notice of Allowance and Search Report in Taiwanese Application No. 108135793, dated May 1, 2023, 3 pages.

Japanese Search Report in Japanese Application No. 2021-514115, dated Jun. 28, 2023, 32 pages.

* cited by examiner

ENRICHMENT AND RADIOISOTOPE PRODUCTION

CROSS-REFERENCE TO RELATED APPLICATIONS

This application claims priority of EP application 18200179.2 which was filed on Oct. 12, 2018 and which is incorporated herein in its entirety by reference.

FIELD

The present invention relates to a combined enrichment and radioisotope production apparatus.

BACKGROUND

Radioisotopes are isotopes which are not stable. A radioisotope will decay after a period of time by emitting a proton and/or neutron. Radioisotopes are used for medical diagnostics and for medical treatments, and are also used in industrial applications The most commonly used medical radioisotope is Tc-99m (Technetium), which is used in diagnostic applications. Production of Tc-99m uses a high flux nuclear reactor. Uranium, comprising a mixture of U-238 and U-235 is bombarded with neutrons in the nuclear reactor. Spontaneous and neutron induced fission of U-235 takes place, and the U-235 separates into Mo-99+Sn(x13)+neutrons. Photon fission of U-238 may also generate Mo-99. The Mo-99 is separated out from the other fission products and shipped to a radiopharmacy. Mo-99 has a half-life of 66 hours and decays to Tc-99m. The Tc-99m has a half-life of only 6 hours (which is useful for medical diagnostic techniques). The Tc-99m is separated from the Mo-99 in a radiopharmacy and is then used for medical diagnostic techniques.

Mo-99 is widely used around the world to generate Tc-99m for medical diagnostic techniques. However, there are only a handful of high flux nuclear reactors which can be used to generate Mo-99. Other radioisotopes are also made using these high flux nuclear reactors. All of the high flux nuclear reactors are over 40 years old and cannot be expected to continue to operate indefinitely.

SUMMARY OF THE INVENTION

It may be considered desirable to provide an alternative radioisotope production apparatus and associated methods and/or associated systems.

According to an aspect of the invention there is provided a combined enrichment and radioisotope production apparatus comprising an electron source arranged to provide an electron beam, the electron source comprising an electron injector and an accelerator, an undulator configured to generate a radiation beam using the electron beam, a molecular stream generator configured to provide a stream of molecules which is intersected by the radiation beam, a receptacle configured to receive molecules or ions selectively received from the stream of molecules, and a target support structure configured to hold a target upon which the electron beam is incident in use.

The apparatus is advantageous because it utilizes the same electron source to generate radioisotopes and to generate the radiation beam which is used for enrichment. Radioisotope production and enrichment can be performed using the same electron source at the same time. This double use of the electron source reduces costs.

The radiation beam may be configured to at least partially ionise the stream of molecules.

The apparatus may further comprise magnets configured to generate a magnetic field which is traversed by the at least partially ionised stream of molecules.

The apparatus may further comprise electrodes configured to generate an electric field which is traversed by the at least partially ionised stream of molecules.

The receptacle may be the first receptacle of two or more receptacles. The first receptacle may be configured to receive ions having a mass which corresponds with a desired isotope. The second receptacle may be configured to receive other ions.

The first receptacle may include a cooled plate onto which the ions condense or solidify. The first receptacle may include a pump which pumps the ions to a container.

The radiation beam may be an infrared radiation beam.

The radiation beam may be configured to excite a desired isotope in the stream of molecules.

The receptacle may be the first receptacle of two or more receptacles. The first receptacle may be configured to receive molecules which include the excited desired isotope. The second receptacle may be configured to receive other molecules.

The first receptacle may comprise an annular opening configured to receive molecules which include the excited desired isotope.

The first receptacle may include a cooled plate onto which the molecules which include the desired isotope condense or solidify. The first receptacle may include a pump which pumps the molecules which include the desired isotope to a container.

The radiation beam may be an ultraviolet radiation beam.

The apparatus may further comprise a controller configured to control the wavelength of the radiation beam by adjusting power delivered to the accelerator.

According to a second aspect of the invention there is provided a method of combined enrichment and radioisotope production comprising using an electron injector and an accelerator to provide an electron beam, using an undulator to generate a radiation beam using the electron beam, providing stream of molecules which is intersected by the radiation beam, selectively receiving in a receptacle molecules or ions from the stream of molecules which comprise a desired isotope, and directing the electron beam onto a target comprising a desired isotope to generate a radioisotope.

The method is advantageous because it utilizes the same electron source to generate radioisotopes and to generate the radiation beam which is used for enrichment. Radioisotope production and enrichment can be performed using the same electron source at the same time. This double use of the electron source reduces costs. An enriched isotope produced using the enrichment method may subsequently be used by radioisotope production method.

The method may further comprise extracting the isotope received in the receptacle and using this to form a subsequent target upon which the electron beam is incident.

The electron beam may have an energy of around 14 MeV or more.

The radiation beam may at least partially ionise the stream of molecules. The at least partially ionised stream of molecules may then pass through a magnetic and/or electric field which alters trajectories of the ions according to their mass.

Ions with a mass which corresponds with a desired isotope may be received in a first receptacle.

The radiation beam may excite a desired isotope in the stream of molecules. The molecules containing the desired isotope may then diverge away from other molecules in the stream of molecules.

The molecules containing the desired isotope may be received in a first receptacle.

Features of any given aspect of the invention may be combined with features of other aspects of the invention.

Various aspects and features of the invention set out above or below may be combined with various other aspects and features of the invention as will be readily apparent to the skilled person.

BRIEF DESCRIPTION OF THE DRAWINGS

Embodiments of the invention will now be described, by way of example only, with reference to the accompanying schematic drawings, in which.

DETAILED DESCRIPTION

Figure 1:
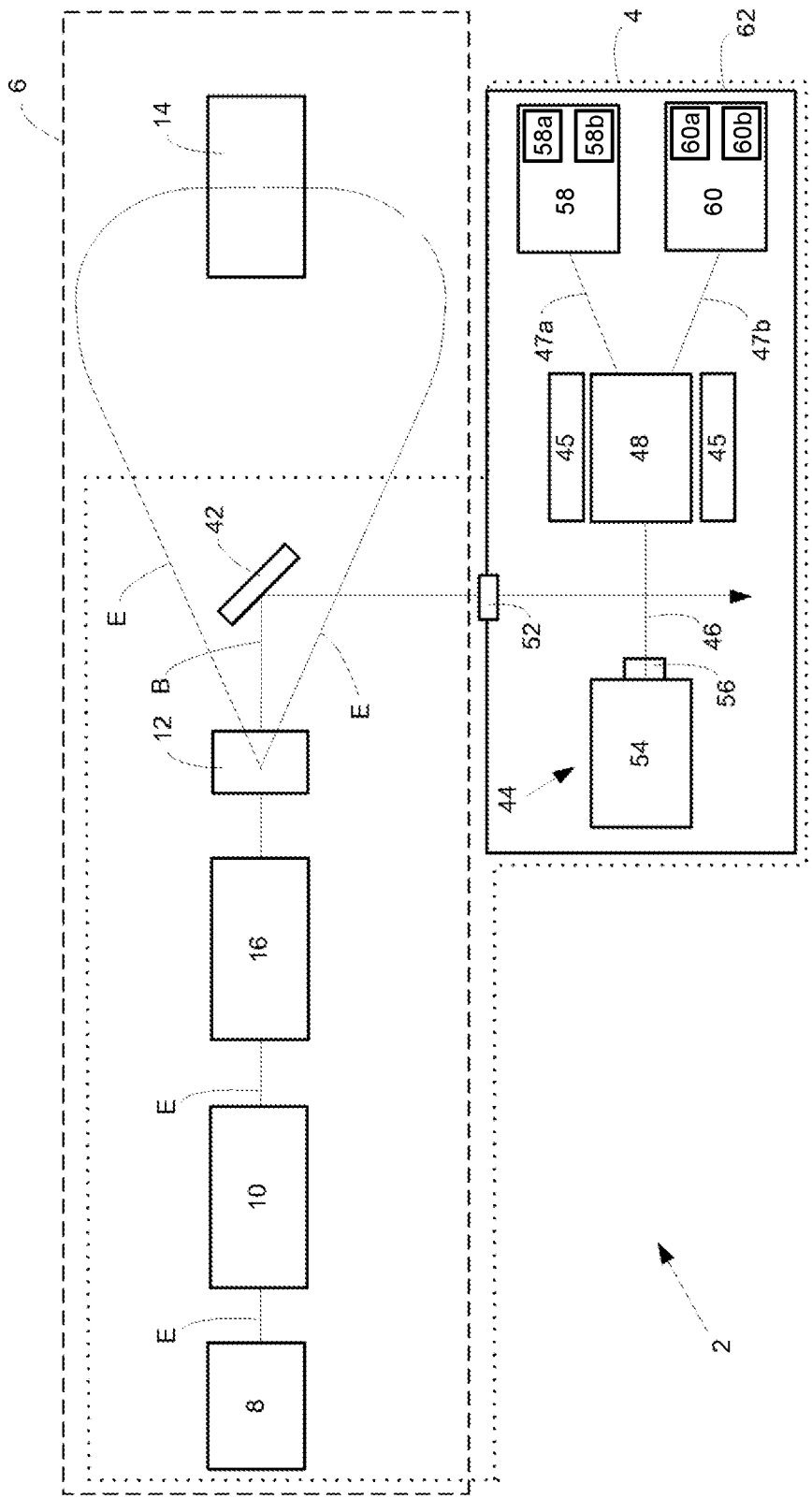
FIG. 1 is a schematic illustration of a combined enrichment and radioisotope production apparatus according to an embodiment of the invention.

FIG. 1 schematically depicts a combined enrichment and radioisotope production apparatus 2 according to an embodiment of the invention. An enrichment apparatus 4 of the combined apparatus 2 is configured to generate enriched Mo-100. This may be starting from a mixture of Mo-100, Mo-98 and other Mo isotopes, or may be starting from a compound containing molybdenum such as $MoF_6$ or $MoO_3$. A radioisotope production apparatus 6 of the combined apparatus is configured to convert enriched Mo-100 to Mo-99. The Mo-99 decays to Tc-99m, which can be separated from the Mo-99 and used for medical diagnostic techniques.

The combined apparatus 2 comprises an electron injector 8 and an electron accelerator 10. The electron accelerator 10 may be a linear accelerator. The electron injector 8 and the linear accelerator 10 both form part of the enrichment apparatus 4 and both form part of the radioisotope production apparatus 6.

The electron injector 8 is arranged to produce a bunched electron beam E, and comprises an electron source (for example a photo-cathode which is illuminated by a pulsed laser beam or a thermionic emission source).

Electrons in the electron beam E may be steered from the electron injector 8 to the linear accelerator 10 by magnets (not shown). The linear accelerator 10 accelerates the electron beam E. In an example, the linear accelerator 10 may comprise a plurality of radio frequency cavities which are axially spaced, and one or more radio frequency power sources which are operable to control the electromagnetic fields along the common axis as bunches of electrons pass between them so as to accelerate each bunch of electrons. The cavities may be superconducting radio frequency cavities. Advantageously, this allows: relatively large electromagnetic fields to be applied at high duty cycles; larger beam apertures, resulting in fewer losses due to wakefields; and for the fraction of radio frequency energy that is transmitted to the beam (as opposed to dissipated through the cavity walls) to be increased. Alternatively, the cavities may be conventionally conducting (i.e. not superconducting), and may be formed from, for example, copper. Other types of linear accelerators may be used such as, for example, laser wake-field accelerators or inverse free electron laser accelerators. As an alternative to a linear accelerator a ring accelerator such as a synchrotron or a rhodotron may be used.

The linear accelerator 10 may consist of a single module or may consist of multiple modules. Although the linear accelerator 10 is depicted as lying along a single axis in FIG. 1, the linear accelerator may comprise multiple modules which do not all lie on a single axis. For example, a bend may be present between some linear accelerator modules and other linear accelerator modules.

The linear accelerator 10 may, for example, accelerate electrons to an energy of around 14 MeV or more. The linear accelerator may accelerate electrons to an energy of around 30 MeV or more (e.g. up to around 75 MeV, up to around 90 MeV, or up to around 100 MeV).

The radioisotope production apparatus 6 further comprises an electron beam splitter 12. An undulator 16 is located between the linear accelerator 10 and the electron beam splitter 12. The undulator does not have a significant effect upon the operation of the radioisotope production apparatus 6 but is an important component of the enrichment apparatus 4 (as is discussed further below). The electron beam splitter 12 is arranged to split the electron beam E along two propagation paths: a first propagation path towards one side of a target 14 and a second propagation path towards an opposite side of the target 14. Magnets (not shown) may be provided to steer the electron beam E along each of the propagation paths. As will be understood by those skilled in the art, the electron beam E is what may be referred to as a pulse train. The electron beam splitter 12 is arranged to direct a portion of the pulses along the first path and a portion of the pulses along the second path. For example, 50% of the pulses in the electron beam E may be sent along the first path, and 50% of the pulses sent along the second path. It will be appreciated, however, that any ratio of pulses (between the two propagation paths) may be used.

The electron beam splitter 12 may be implemented using any appropriate means and may be, for example a deflector (e.g. a kicker) utilizing magnetic or electrostatic deflection. The splitting may be done at a sufficiently high frequency that a thermal load from the electron beam E is distributed substantially evenly on each side of the target 14. In some embodiments, pulses may be skipped within the electron beam E to allow time for switching between pulses. By way of example, if pulses are generated at 375 MHz, then 1000 pulses may be skipped every 20 milliseconds, leaving approximately 3 microseconds for the beam splitter 12 to switch the propagation path of the electron beam E.

The target 14 is configured to receive the electrons of the electron beam E and to use the electrons to convert a source material into a radioisotope. In this embodiment, target 14 may be Mo-100 (Mo-100 is a stable and naturally occurring isotope of Mo) which is to be converted into Mo-99 via photon induced neutron emission. The mechanism via which the photons are generated is Bremsstrahlung radiation (in English: braking radiation) generated as a result of the electrons hitting the target 14. The energy of the photons generated in this manner may, for example, be greater than 100 keV, may be greater than 1 MeV, and may be greater than 10 MeV. The photons may be described as very hard X-rays.

This reaction has a threshold energy of 8.29 MeV, and thus will not occur if photons incident upon the photon target 5 have an energy less than 8.29 MeV. The reaction has a cross-section which peaks at around 14 MeV (the reaction cross-section is indicative of the chances of the reaction being induced by a photon with a given energy). In other words, the reaction has a resonance peak at around 14 MeV. Therefore, in an embodiment photons with an energy of around 14 MeV or more may be used to convert a Mo-100 photon target into Mo-99.

The energy of the photons generated by the braking radiation has an upper limit which is set by the energy of the electrons in the electron beam E. The photons will have a distribution of energies, but the upper limit of that distribution will not extend beyond the energy of the electrons in the electron beam. Thus, in an embodiment used to convert a Mo-100 photon target into Mo-99 the electron beam will have an energy of at least 8.29 MeV. In an embodiment the electron beam E may have an energy of around 14 MeV or more.

As the energy of the electron beam is increased, more photons with energies sufficient to cause the desired reaction will be generated (for the same current of electrons). For example, as noted above Mo-99 generation has a cross-section which peaks at around 14 MeV. If the electron beam E has an energy of around 28 MeV then each electron may generate two photons with an energy of around 14 MeV, thereby increasing conversion of the photon target to Mo-99. However, as the energy of the electron beam is increased photons with higher energies will induce other unwanted reactions. For example, photon induced emission of a neutron and a proton has a threshold energy of 18 MeV. This reaction is not desired because it does not generate Mo-99 but instead generates an unwanted reaction product.

In general, the selection of the energy of the electron beam (and hence the maximum energy of the photons) may be based on a comparison between the yield of wanted products (e.g. Mo-99) and the yield of unwanted products. In an embodiment, the electron beam may have an energy of around 14 MeV or more. The electron beam E may for example have an energy of around 30 MeV or more (e.g. up to around 45 MeV). This range of electron beam energies may provide good productivity of photons with energies around the reaction resonance peak of 14 MeV. In other embodiments, however, the electron beam may have other energies. For example, the electron beam may have an energy of 60 MeV as electrons at this energy may be capable of causing multiple reactions and thereby increasing the yield.

Figure 2A:
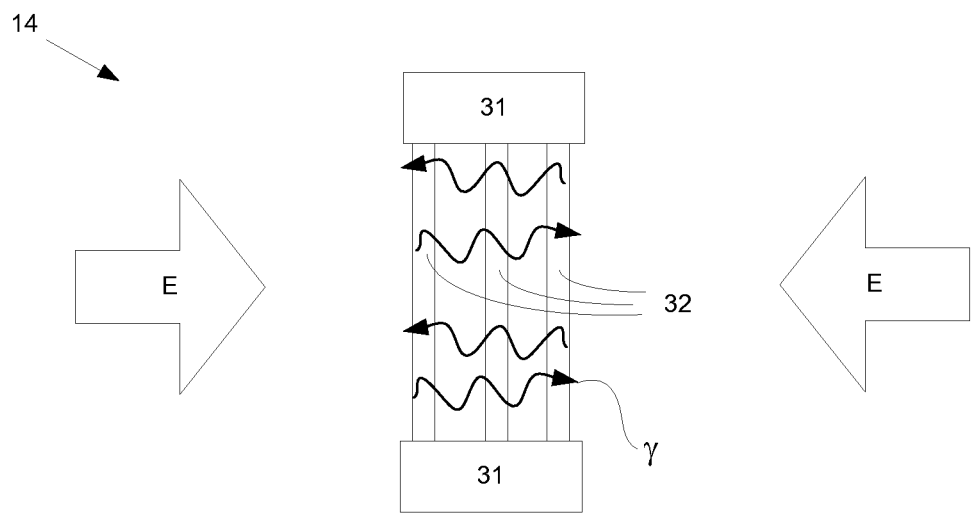
FIG. 2a is a schematic illustration of a target of the radioisotope production apparatus of FIG. 1.

FIG. 2a schematically depicts an example arrangement of the target 14. In FIG. 2a, the target 14 comprises a plurality of plates 32 of Mo-100 supported by a support structure 31. As described above, when electrons in the electron beam E are incident on the plates 32, photons are emitted. The photons emitted from the target 14 are schematically depicted by wavy lines γ in FIG. 2a. When a photon γ is incident upon a Mo-100 nucleus it may cause a photonuclear reaction via which a neutron is ejected from the nucleus. The Mo-100 atom is thereby converted to an Mo-99 atom. In the arrangement of FIG. 2a, the plates 32 may be considered to be both an electron target and a photon target.

The target 14 may receive photons γ for a period of time, during which the proportion of Mo-99 in the target 14 increases and the proportion of Mo-100 in the target decreases. The target 14 is then removed from the radioisotope production apparatus 6 for processing and transportation to a radiopharmacy. Tc-99, which is the decay product of Mo-99, is then extracted and used in medical diagnostic applications.

Figure 2B:
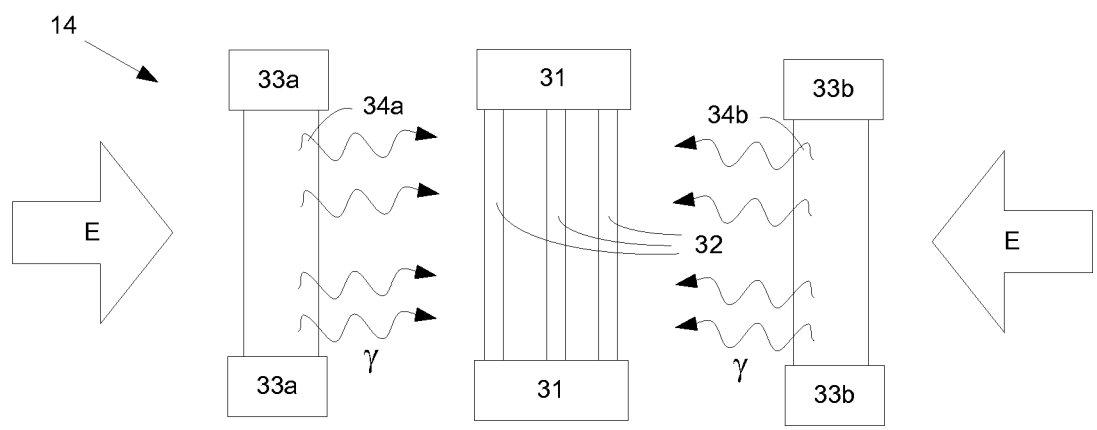
FIG. 2b is a schematic illustration of an alternative target of the radioisotope production apparatus of FIG. 1.

FIG. 2b schematically depicts an alternative example arrangement of the target 14. In FIG. 2b, a target 14 further comprises separate electron targets 34. Where a separate electron target is provided, the target plates 32 may be considered to be a photon target. The electron targets 34 may, for example, be formed from tungsten, tantalum or some other material which will decelerate the electrons and generate photons. The electron targets 34, may, however, be formed from the same material as a photon target (e.g. Mo-100). The electron targets are held by support structures 33a, 33b.

Although the targets 14 shown in FIGS. 2a and 2b comprise three plates, the targets may comprise any suitable number of plates. Although the described target comprises Mo-100, the photon target may comprise any suitable material. Similarly, the material of the target may be provided in any suitable shape and/or configuration. Shielding may be provided around targets 14 (e.g. lead shielding).

Each electron target 34a, 34b of FIG. 2b is depicted as a single block of material. However, each electron target may be provided as a plurality of plates. The plates may for example have a construction which corresponds to the construction of the target plates 32 described above. Similarly, the support structures 33a, 33b may be configured to hold a plurality of electron target plates.

The electron target 34 and the target plates 32 may be provided with conduits through which coolant fluid is flowed.

Other forms of target support structure may be provided.

In both FIG. 2a and FIG. 2b the electron beam E is received at each side of the target 14. By distributing the heat load more uniformly across the target 14, the total temperature generated is reduced, thereby easing and simplifying cooling requirements (compared with directing the electron beam E onto only one side of the target 14).

In other embodiments of the invention an electron beam splitter 12 is not present. In such embodiments a single electron beam may be incident upon the target 14.

As noted further above, the electron injector 8 and the linear accelerator 10 form part of the enrichment apparatus 4 in addition to forming part of the radioisotope production apparatus 6. The enrichment apparatus 4 further comprises an undulator 16. The electron beam E enters the undulator 16 following acceleration by the linear accelerator 10. Optionally, the electron beam E may pass through a bunch compressor (not shown), disposed between the linear accelerator 10 and the undulator 16. The bunch compressor may be configured to spatially compress existing bunches of electrons in the electron beam E.

The undulator 16 may comprise a plurality of modules or a single module. The or each module comprises a periodic magnet structure, which is operable to produce a periodic magnetic field and is arranged so as to guide the electron beam E produced by the electron injector 8 and linear accelerator 10 along a periodic path within that module. The periodic magnetic field produced by the undulator 16 causes the electrons to follow an oscillating path about a central axis. As a result, within the undulator 16 the electrons radiate electromagnetic radiation generally in the direction of the central axis of the undulator. The radiated electromagnetic radiation forms a beam B of radiation (e.g. infrared radiation). The beam B is directed such that it intersects with a gaseous flow of Mo, thereby facilitating Mo enrichment (as is described further below).

The path followed by the electrons of the electron beam E in the undulator 16 may be sinusoidal and planar, with the electrons periodically traversing the central axis. Alternatively, the path may be helical, with the electrons rotating about the central axis. The type of oscillating path may affect the polarization of the radiation beam B emitted by the undulator 16.

As electrons move through the undulator 16, they interact with the electric field of the radiation, exchanging energy with the radiation. In general the amount of energy exchanged between the electrons and the radiation will oscillate rapidly unless conditions are close to a resonance condition. Under resonance conditions, the interaction between the electrons and the radiation causes the electrons to bunch together into microbunches, modulated at the wavelength of radiation within the undulator, and coherent emission of radiation along the central axis is stimulated. The resonance condition may be given by:

$$\lambda_{em} = \frac{\lambda_u}{2\gamma^2}\left(1 + \frac{K^2}{A}\right), \quad (1)$$

where $\lambda_{em}$ is the wavelength of the radiation, $\lambda_u$ is the undulator period for the undulator module that the electrons are propagating through, $\gamma$ is the Lorentz factor of the electrons and K is the undulator parameter. A is dependent upon the geometry of the undulator 16: for a helical undulator that produces circularly polarized radiation A=1, for a planar undulator A=2, and for a helical undulator which produces elliptically polarized radiation (that is neither circularly polarized nor linearly polarized) 1<A<2. In practice, each bunch of electrons will have a spread of energies although this spread may be minimized as far as possible (by producing an electron beam E with low emittance). The undulator parameter K is typically approximately 1 and is given by:

$$K = \frac{q\lambda_u B_0}{2\pi mc}, \quad (2)$$

where q and m are, respectively, the electric charge and mass of the electrons, $B_0$ is the amplitude of the periodic magnetic field, and c is the speed of light.

The resonant wavelength $\lambda_{em}$ is equal to the first harmonic wavelength spontaneously radiated by electrons moving through the or each undulator module. The electron injector 8, accelerator 10 and undulator 16 may together be considered to be a free electron laser.

The radiation beam B which is generated by the undulator 16 may be an infrared radiation beam. For example, the radiation beam B may have a wavelength of around 10 microns (e.g. between 9 microns and 11 microns). A wavelength of around 10 microns is particularly suitable for enrichment of Molybdenum.

In an embodiment, the electron beam delivered to the undulator 16 from the accelerator 10 may have an energy of around 60 MeV. The undulator 16 may have a magnetic period of around 140 mm. An undulator length of around 4.5 meters may be sufficient to provide saturation of the radiation beam B emitted by the undulator. Each electron pulse of 75 pC bunch charge and 10 fs bunch length will create about 100 µJ of infrared radiation. The bunch frequency is 375 MHz. With this set of electron beam and undulator parameters, a power in excess of 35 kW of the infrared radiation beam B may be generated. In another example the bunch frequency may be around 1.3 GHz. In general, the parameters of the electron beam E may be any suitable parameters, and may be selected to provide the radiation beam B with a desired power.

Generating the infrared radiation beam B using the undulator 30 takes away only a small fraction of the energy of the electron beam E. Consequently, the electron beam E still has plenty of energy to convert Mo-99 (or a compound containing Mo) into Mo-100 in the exposure cell 14.

A beam steering minor 42 directs the infrared beam B towards a gaseous flow of Molybdenum (or a compound containing Molybdenum). Although a single beam steering minor 42 is depicted, in practice two or more beam steering mirrors may be provided in order to allow the position of the radiation beam to be adjusted with additional flexibility. Due to the schematic nature of FIG. 1, it appears as though the infrared beam B intersects with the electron beam E. However, the infrared radiation beam B may easily be directed such that it travels around the electron beam E (e.g. over or under the electron beam).

The enrichment apparatus 4 comprises a Molybdenum flow generator 44, magnets 45, a first receptacle 58 and a second receptacle 60 The Molybdenum flow generator 44, magnets 45 and receptacles 58, 60 may be provided within a housing 62 which is sealed such that they are isolated from the external environment. A window 52 may be provided in the housing 62 to allow the infrared beam B to enter the housing.

The Molybdenum flow generator 44 may comprise a container 54 which contains $MoO_3$ or $MoF_6$, or some other gaseous Molybdenum containing molecule. Other gaseous Molybdenum containing molecules may be used, although these may need to be heated to a higher temperature, e.g. in excess of 200 C, to form a gas ($MoF_6$ boils at just 34 C). The container 54 includes an opening at one end. The opening comprises a nozzle 56 which is configured to generate a stream 46 of the gaseous Molybdenum containing molecules. The infrared beam B intersects the stream of gaseous Molybdenum containing molecules, and at least partially ionizes the stream. In an embodiment an oxygen atom may be stripped off the $MoO_3$ to form $MoO_2$. In another embodiment a fluorine atom may be stripped off the $MoF_6$ to form $MoF_5$. The stream of at least partially ionized molecules passes through a magnetic field 48 generated by the magnets 45. Additionally or alternatively a differential voltage applied to electrodes may be used to generate an electric field. An electric field and a magnetic field which are orthogonal to each other may provide the most effective separation of molecules.

The path travelled by ions of the stream 46 through a magnetic field generated by the magnets 45 depends on the mass and charge of the ions. As a result molecules which have a higher-mass ions (e.g. molecules containing Mo-100) will exit the magnetic field at a different position and with a different trajectory than the lower mass ions (e.g. molecules containing Mo-92 to Mo-98).

Higher-mass ions (molecules containing Mo-100) form a first ion stream 47a. This first ion stream 47a enters a first receptacle 58 and is retained within the first receptacle. In general, ions having a mass which corresponds with a desired isotope are received by the first receptacle 58. The first receptacle 58 may for example contain a cooled plate 58a onto which the gaseous molecules condense or solidify. Alternatively, the first receptacle 58 may comprise a pump 58b which pumps the gaseous molecules to a collecting container.

The second ion stream 47b has a different trajectory and enters a second receptacle 60. The second ion stream, which consists of lower mass ions, is retained in the second receptacle 60. In general, ions having a mass which does not corresponds with a desired isotope are received by the second receptacle 60. The second receptacle 60 may for example contain a cooled plate 60a onto which the gaseous molecules condense or solidify. Alternatively, the second receptacle 60 may comprise a pump 60b which pumps the gaseous molecules to a collecting container.

In this way, the enrichment apparatus 4 separates molecules containing Mo-100 from molecules containing Mo-92 to Mo-98. In other words, enrichment of Molybdenum which increases the percentage of Mo-100 is achieved. The enriched Mo forms part of the target 32 which is described elsewhere in this document.

As would be appreciated from equations (1) and (2), the wavelength of the radiation beam B output from the undulator 16 may be selected via appropriate selection of the period of the undulator magnetic field, or the Lorentz factor of the electrons (which is determined by the energy of the electrons). As noted elsewhere in this document, there is a broad range of tens of MeV over which electrons may be incident upon Mo-100 and still provide reasonably efficient conversion to Mo-99. Thus, if a particular wavelength of infrared radiation beam B is required for enrichment of Mo, then the energy of the electron beam E may be adjusted until a radiation beam having that wavelength is generated by the undulator 16. Adjusting the energy of the electron beam E is significantly easier than adjusting the periodicity of the undulator. The energy of the electron beam E may be adjusted by adjusting power delivered to the accelerator 10. The adjustments may be controlled by a controller (not depicted). The controller may receive feedback which indicates the wavelength of the radiation beam, and may operate using a feedback loop to keep the wavelength of the radiation beam at a desired wavelength.

Figure 3:
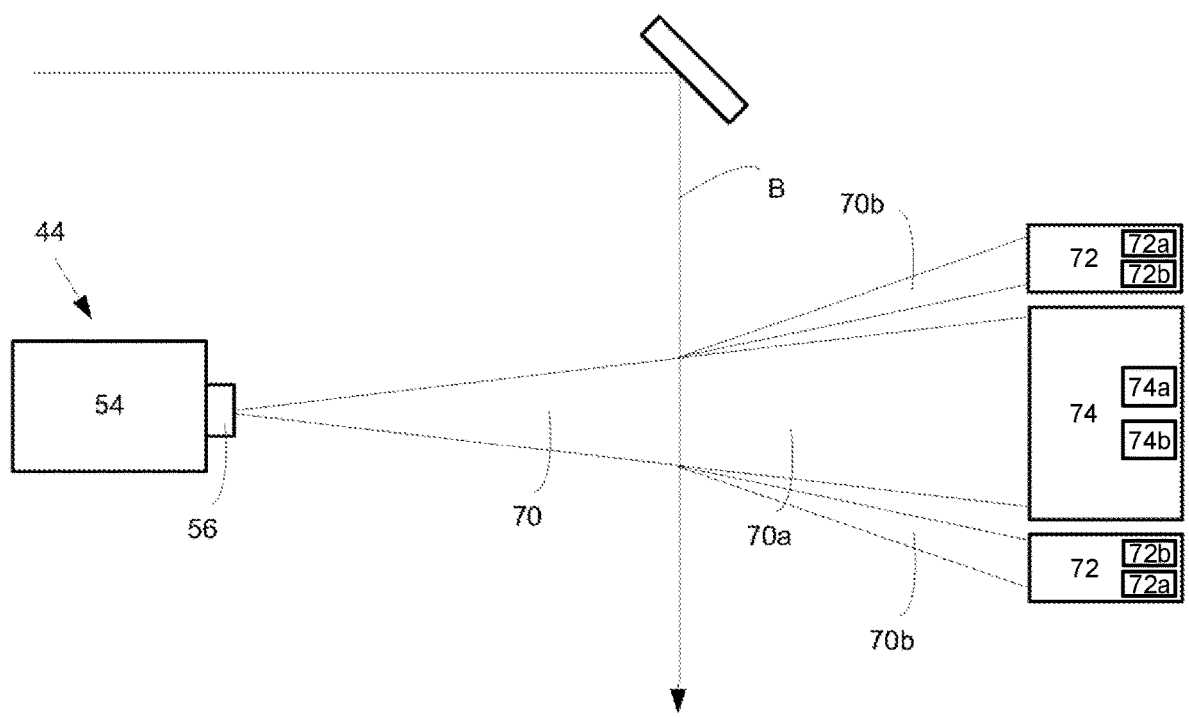
FIG. 3 is a schematic illustration of an alternative enrichment apparatus which may form part of a combined enrichment and radioisotope production apparatus according to an alternative embodiment of the invention.

An alternative enrichment apparatus is schematically depicted in FIG. 3. In the alternative enrichment arrangement a Molybdenum stream generator 44 comprising a container 54 and a nozzle 56 is used to provide a stream 70 of gaseous Molybdenum containing molecules (e.g. $MoO_3$ or $MoF_6$). In general the generator 44 is configured to generate a stream of molecules, and may be referred to as a molecular stream generator. A radiation beam B intersects the stream 70. The wavelength of the radiation beam is selected such that it excites a particular isotope of Molybdenum (e.g. Mo-100). That is, the wavelength of the radiation beam B corresponds with an atomic transition of that isotope and not of other isotopes, and as a result is preferentially absorbed by that isotope. The isotope which preferentially absorbs the radiation beam B (e.g. Mo-100) is excited and thus vibrates more. This causes molecules which contain that isotope to diverge away from a central axis of the stream of Molybdenum containing molecules. As a result, the stream 70 comprises a first portion 70a which diverges at the same rate as upstream of the radiation beam B, and a second portion 70b which diverges at a greater rate than upstream of the radiation beam.

A first receptacle 72 is arranged to receive the second portion 70b of the stream of molecules. The first receptacle 72 may comprise an annular opening. The first receptacle 72 may be generally annular. A central receptacle 74 is arranged to receive the first portion 70a of the stream molecules. The central receptacle 74 may by referred to as the second receptacle. In this way an isotope such as Mo-100 may be separated from other isotopes such as MO-92 to MO-98.

The first receptacle 72 may for example contain a cooled plate 72a onto which the molecules containing the desired isotope condense or solidify. Alternatively, the first receptacle 72 may comprise a pump 72b which pumps the molecules containing the desired isotope to a collecting container. The second receptacle 74 may for example contain a cooled plate 74a onto which the other molecules condense or solidify. Alternatively, the second receptacle 74 may comprise a pump 74b which pumps the other molecules to a collecting container.

The enrichment apparatus depicted in FIG. 3 uses a radiation beam B with a well-controlled wavelength. That is, the wavelength is controlled sufficiently accurately to ensure that it predominantly excites one Molybdenum isotope in preference to other Molybdenum isotopes. The electron injector 8, accelerator 10 and undulator 16 (which together may comprise a free electron laser) provide good stability and adjustability, and are thus capable of providing a radiation beam B with a desired wavelength which is sufficiently well controlled. As noted above, the wavelength of the radiation beam B may be controlled by adjusting the power delivered to the accelerator 10.

The electron orbits of Mo-100 are most different to the electron orbits of Mo-92 to Mo-98 close to the nucleus. The energies of these electron orbits correspond with wavelengths which are shorter than infrared radiation. For this reason, the radiation beam B may have a shorter wavelength than infrared radiation, e.g. ultraviolet radiation. An ultraviolet radiation beam may for example be generated by applying non-linear effects such as frequency doubling to the infrared beam (e.g. using one or more frequency doubling crystals).

In the embodiment depicted in FIG. 1 an electron beam splitter 12 is used to split the electron beam E. In addition to splitting the electron beam, the electron beam splitter 12 also separates the electron beam E from the infrared radiation beam B. In an alternative arrangement (not depicted), magnets may be used to bend the path of the electron beam E such that the electron beam bends away from the infrared radiation beam B. In this way the electron beam E and the infrared radiation beam B may be separated.

Although the above description refers to enrichment of Molybdenum, embodiments of the invention may also be used for enrichment of other materials such as for example uranium.

In an embodiment, the electron injector 8, accelerator 10 and undulator 16 may be configured to provide an electron beam E with a current of 10 mA or more. The current may, for example, be up to 100 mA or more. An electron beam E with a high current (e.g. 10 mA or more) is advantageous because it increases the specific activity of the radioisotope produced by the radioisotope production apparatus 6.

As explained further above, Mo-100 may be converted to Mo-99 (a desired radioisotope) using very hard X-ray photons generated by an electron beam hitting an electron target. The half-life of Mo-99 is 66 hours. As a consequence of this half-life there is a limit to the specific activity of Mo-99 which can be provided when starting with Mo-100, the limit being determined by the rate at which Mo-99 is generated. If the Mo-99 is generated at a relatively low rate, for example using an electron beam current of around 1-3 mA, then it may not be possible to provide a specific activity of more than around 40 Ci/g of Mo-99 in the target. This is because although the irradiation time may be increased in order to allow generation of more Mo-99 atoms, a significant proportion of those atoms will decay during the irradiation time. The threshold of specific activity of Mo-99 used in medical applications in Europe should be 100 Ci/g, and thus Mo-99 with a specific activity of 40 Ci/g or less is not useful.

When a higher electron beam current is used the rate at which Mo-99 atoms are generated is increased accordingly (assuming that the volume of Mo-99 which receives photons remains the same). Thus, for example, for a given volume of Mo-99, an electron beam current of 10 mA will generate Mo-99 at 10 times the rate of generation provided by an electron beam current of 1 mA. The electron beam current used by embodiments of the invention may be sufficiently high that a specific activity of Mo-99 in excess of 100 Ci/g is achieved. For example, an embodiment of the invention may provide an electron beam with a beam current of around 30 mA. Simulations indicate that, for a beam current of around 30 mA, if the electron beam has an energy of around 35 MeV and the volume of the Mo-100 target is around 5000 mm$^3$ then a specific activity of Mo-99 in excess of 100 Ci/g can be obtained. The Mo-100 target may for example comprise of 20 plates with a diameter of around 25 mm and a thickness of around 0.5 mm. Other numbers of plates, which may have non-circular shapes and may have other thicknesses, may be used.

The embodiments may further be described using the following clauses:

1. A combined enrichment and radioisotope production apparatus comprising:
an electron source arranged to provide an electron beam, the electron source comprising an electron injector and an accelerator;
an undulator configured to generate a radiation beam using the electron beam;
a molecular stream generator configured to provide a stream of molecules which is intersected by the radiation beam;
a receptacle configured to receive molecules or ions selectively received from the stream of molecules; and
a target support structure configured to hold a target upon which the electron beam is incident in use.

2. The apparatus of clause 1, wherein the radiation beam is configured to at least partially ionise the stream of molecules.

3. The apparatus of clause 2, wherein the apparatus further comprises magnets configured to generate a magnetic field which is traversed by the at least partially ionised stream of molecules.

4. The apparatus of clause 2 or clause 3, wherein the apparatus further comprises electrodes configured to generate an electric field which is traversed by the at least partially ionised stream of molecules.

5. The apparatus of clause 3 or clause 4, wherein the receptacle is the first receptacle of two or more receptacles, the first receptacle being configured to receive ions having a mass which corresponds with a desired isotope, and the second receptacle being configured to receive other ions.

6. The apparatus of clause 5, wherein the first receptacle includes a cooled plate onto which the ions condense or solidify, or a pump which pumps the ions to a container.

7. The apparatus of any of clauses 2 to 6, wherein the radiation beam is an infrared radiation beam.

8. The apparatus of clause 1, wherein the radiation beam is configured to excite a desired isotope in the stream of molecules.

9. The apparatus of clause 8, wherein the receptacle is the first receptacle of two or more receptacles, the first receptacle being configured to receive molecules which include the excited desired isotope, and the second receptacle being configured to receive other molecules.

10. The apparatus of clause 9, wherein the first receptacle comprises an annular opening configured to receive molecules which include the excited desired isotope.

11. The apparatus of clause 9 or clause 10, wherein the first receptacle includes a cooled plate onto which the molecules which include the desired isotope condense or solidify, or a pump which pumps the molecules which include the desired isotope to a container.

12. The apparatus of any of clauses 8 to 11, wherein the radiation beam is an ultraviolet radiation beam.

13. The apparatus of any preceding clauses, wherein the apparatus further comprises a controller configured to control the wavelength of the radiation beam by adjusting power delivered to the accelerator.

14. A method of combined enrichment and radioisotope production comprising:
using an electron injector and an accelerator to provide an electron beam;
using an undulator to generate a radiation beam using the electron beam;
providing stream of molecules which is intersected by the radiation beam;
selectively receiving in a receptacle molecules or ions from the stream of molecules which comprise a desired isotope; and
directing the electron beam onto a target comprising a desired isotope to generate a radioisotope.

15. The method of clause 14, wherein the method further comprises extracting the isotope received in the receptacle and using this to form a subsequent target upon which the electron beam is incident.

16. The method of clause 14 or clause 15, wherein the electron beam has an energy of around 14 MeV or more.

17. The method of any of clauses 14 to 16, wherein the radiation beam at least partially ionises the stream of molecules, and wherein the at least partially ionised stream of molecules then passes through a magnetic and/or electric field which alters trajectories of the ions according to their mass.

18. The method of clause 17, wherein ions with a mass which corresponds with a desired isotope are received in a first receptacle.

19. The method of any of clauses 14 to 16, wherein the radiation beam excites a desired isotope in the stream of molecules, and wherein the molecules containing the desired isotope then diverge away from other molecules in the stream of molecules.

20. The method of clause 19, wherein the molecules containing the desired isotope are received in a first receptacle.

As noted further above, an electron injector of an embodiment of the invention may be a photo-cathode which is illuminated by a pulsed laser beam. The laser may, for example, comprise a Nd:YAG laser together with associated optical amplifiers. The laser may be configured to generate picosecond laser pulses. The current of the electron beam may be adjusted by adjusting the power of the pulsed laser beam. For example, increasing the power of the pulsed laser beam will increase the number of electrons emitted from the photo-cathode and thereby increase the electron beam current.

The electron beam E used by a radioisotope production apparatus 6 according to an embodiment of the invention may, for example, have a diameter of 1 mm and a divergence of 1 mrad. Increasing the current in the electron beam E will tend to cause the electrons to spread out due to space charge effects, and thus may increase the diameter of the electron beam. Increasing the current of the electron beam may therefore reduce the brightness of the electron beam. However, the radioisotope production apparatus 6 does not require an electron beam E with, for example, a diameter of 1 mm and may utilize an electron beam with a greater diameter. Thus, increasing the current of the electron beam may not reduce the brightness of the beam to such an extent that radioisotope production is significantly negatively affected. Indeed, providing the electron beam with a diameter greater than 1 mm may be advantageous because it spreads the thermal load delivered by the electron beam. It will be appreciated, however, that other injector types may also be used.

Although embodiments of the invention have been described in connection with generation of the radioisotope Mo-99, embodiments of the invention may be used to generate other radioisotopes. In general, embodiments of the invention may be used to generate any radioisotope which may be formed via direction of very hard X-rays onto a source material.

An advantage of the invention is that it provides production of radioisotopes without requiring the use of a high flux nuclear reactor. A further advantage is that it does not require the use of highly enriched uranium (a dangerous material which is subject to non-proliferation rules).

Although embodiments of the invention have been described as using Mo-100 to generate Mo-99 radioisotope which decays to Tc-99, other medically useful radioisotopes may be generated using embodiments of the invention. For example, embodiments of the invention may be used to generate Ge-68, which decays to Ga-68. Embodiments of the invention may be used to generate W-188, which decays to Re-188. Embodiments of the invention may be used to generate Ac-225, which decays to Bi-213, Sc-47, Cu-64, Pd-103, Rh-103m, In-111, I-123, Sm-153, Er-169 and Re-186.

Embodiments of the invention have been described in the context of a free electron laser FEL which outputs an infrared radiation beam. However a free electron laser FEL may be configured to output radiation having any wavelength. Some embodiments of the invention may therefore comprise a free electron laser which outputs a radiation beam which is not an infrared radiation beam.

Different embodiments may be combined with each other. Features of embodiments may be combined with features of other embodiments.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An apparatus comprising:
    an electron source arranged to provide an electron beam, the electron source comprising an electron injector and an accelerator;
    an undulator configured to generate a radiation beam using the electron beam;
    a molecular stream generator configured to provide a stream of molecules which is intersected by the radiation beam;
    a receptacle configured to receive molecules or ions selectively received from the stream of molecules; and
    a target support structure configured to hold a target upon which the electron beam is incident in use,
    wherein the target comprises a desired isotope to generate a radioisotope.

2. The apparatus of claim 1, wherein the radiation beam is configured to at least partially ionise the stream of molecules.

3. The apparatus of claim 2, wherein the apparatus further comprises magnets configured to generate a magnetic field that is traversed by the at least partially ionised stream of molecules.

4. The apparatus of claim 2, wherein the apparatus further comprises electrodes configured to generate an electric field that is traversed by the at least partially ionised stream of molecules.

5. The apparatus of claim 2, wherein the receptacle comprises a first receptacle and a second receptacle, the first receptacle being configured to receive ions having a mass that corresponds with a desired isotope, and the second receptacle being configured to receive other ions.

6. The apparatus of claim 5, wherein the first receptacle includes a cooled plate onto which the ions condense or solidify.

7. The apparatus of claim 2, wherein the radiation beam is an infrared radiation beam.

8. The apparatus of claim 1, wherein the radiation beam is configured to excite a desired isotope in the stream of molecules.

9. The apparatus of claim 8, wherein the receptacle comprises a first receptacle and a second receptacle, the first receptacle being configured to receive molecules which include the excited desired isotope, and the second receptacle being configured to receive other molecules.

10. The apparatus of claim 9, wherein the first receptacle comprises an annular opening configured to receive molecules which include the excited desired isotope.

11. The apparatus of claim 8, wherein the radiation beam is an ultraviolet radiation beam.

12. The apparatus of claim 5, wherein the first receptacle includes a pump which pumps the ions to a collecting container.

13. The apparatus of claim 1, wherein the selectively received molecules or ions in the receptacle form part of the target.

14. The apparatus of claim 1, wherein the target comprises enriched molybdenum (Mo).

15. The apparatus of claim 14, wherein the desired isotope comprises Mo-100.

16. The apparatus of claim 1, wherein the target comprises a plurality of plates supported by the target support structure.

17. A method comprising:
    using an electron injector and an accelerator to provide an electron beam;
    using an undulator to generate a radiation beam using the electron beam;
    providing a stream of molecules which is intersected by the radiation beam;
    selectively receiving, in a receptacle, molecules or ions from the stream of molecules which comprise a desired isotope; and
    directing the electron beam onto a target comprising a desired isotope to generate a radioisotope.

18. The method of claim 17, wherein the method further comprises:
  extracting the desired isotope received in the receptacle; and
  using the desired isotope to form a subsequent target upon which the electron beam is incident.

19. The method of claim 17, wherein:
  the radiation beam at least partially ionises the stream of molecules, and
  the at least partially ionised stream of molecules then passes through a magnetic and/or electric field that alters trajectories of the ions according to their mass.

20. The method of claim 17, wherein:
  the radiation beam excites a desired isotope in the stream of molecules, and
  the molecules containing the desired isotope then diverge away from other molecules in the stream of molecules.

\* \* \* \* \*